Patented Nov. 19, 1940

2,222,208

UNITED STATES PATENT OFFICE 2,222,208

NITROGENOUS CONDENSATION PRODUCT AND A PROCESS OF PRODUCING SAME

Heinrich Ulrich, Ludwigshafen-on-the-Rhine, Germany, assignor, by mesne assignments, to General Aniline & Film Corporation, New York, N. Y., a corporation of Delaware No Drawing. Application October 15, 1938, Serial No. 235,241. In Germany August 16, 1935

10 Claims. (Cl. 260—339)

The present invention relates to new nitrogenous condensation products and a process of producing same.

The present application is a continuation-in-part of my copending application Serial No. 93,767 filed on August 1, 1936.

In the latter application there is described a process of producing nitrogenous products by causing alkylene imines to react with organic compounds containing at least one group capable of reacting with basic compounds. The alkylene imines may be employed in the monomeric or polymeric form.

I have now found that very valuable nitrogenous condensation products are obtained by causing alkylene imines (in the monomeric or polymeric form) to react with a special class of organic compounds containing at least one group capable of reacting with basic compounds, namely with aliphatic esters of isocyanic acid.

The alkylene imines to be employed are the same as in the said application Serial No. 93,767; for example ethylene imine, C- or N-methyl ethylene imines, 1.2-dodecylene imine and their polymerization products of any degree of polymerization may be employed. Alkylene imines containing alkyl radicles interrupted by hetero atoms may also be employed, for example the reaction product of ethylene imine with $\beta.\beta'$-dichlor diethyl ether.

As suitable aliphatic esters of isocyanic acid there may be mentioned the methyl-, butyl-, octyl-, decyl-, dodecyl- and octodecyl esters of isocyanic acid. Esters derived from mixtures of aliphatic alcohols, for example such as are obtainable by reduction of naturally occurring fatty acid mixtures, are very suitable.

The reaction conditions may vary in wide limits; they are selected in dependency on the initial materials. Usually the reaction is carried out between room temperature (about 20° C.) and 100° C., but higher and, in the case of very reactive initial materials, lower temperatures, such as 0° or lower may also be suitable. Frequently the heat developed when the components are mixed is sufficient for effecting complete reaction. The reaction may be carried out in alkaline media. Frequently it is advantageous to work in the presence of solvents or diluents. The process may be carried out under any desired pressure. While it is usually sufficient to work under atmospheric pressure, higher pressure may also be useful, especially when readily volatile initial materials are employed.

The products obtainable according to the present invention are suitable for different purposes; for example they may be employed as assistants for the pharmaceutical, cosmetic, textile, leather, lacquer, rubber and like industries. They may be used with advantage as additions to spinning baths in the production of artificial silk.

The following examples will further illustrate how this invention is carried out in practice, but the invention is not restricted to these examples. The parts are by weight.

Example 1

88 parts of water-soluble or water-insoluble polymeric ethylene imine are reacted with 300 parts of the octodecyl ester of isocyanic acid (stearyl isocyanate) by warming. The reaction product is probably a urea derivative and may serve as a textile assistant. The reaction of the two components may also be carried out in the presence of textile fibers, the condensation product thus being formed on or in the fibers.

Instead of polymeric ethylene imine its reaction product with $\beta.\beta'$-dichlor diethyl ether may be employed.

Example 2

45 parts of 95 per cent ethylene imine are mixed with 57 parts of the methyl ester of isocyanic acid while cooling. The temperature of the mixture rises and a water-clear liquid product is formed which is easily soluble in water.

A similar product is obtained when the ethylene imine is replaced by the equimolecular amount of 1.2-propylene imine.

Example 3

98 parts of the butyl ester of isocyanic acid are mixed with 45 parts of 95 per cent ethylene imine. By the reaction of the two components which goes on with the development of heat, an oily product is formed which is difficultly soluble in water, but easily soluble in dilute acetic acid.

Example 4

45 parts of ethylene imine are added to 155 parts of the isooctyl ester of isocyanic acid while cooling. A colorless oily product is formed which is soluble in water only after the addition of acid. Its solutions possess a good foaming power.

Example 5

215 parts of polymeric ethylene imine are diluted with 215 parts of water. 155 parts of the isooctyl ester of isocyanic are added while shaking vigorously. Heat is developed and the reaction goes on without external heating. If desired it may be completed by warming. As soon as it is finished, a paste-like reaction product is obtained which may be employed for animalizing vegetable or artificial fibers.

A similar product is obtained if instead of the polymeric ethylene imine the equimolecular amount of polymeric 1.2-propylene imine is employed.

Instead of the isooctyl ester of isocyanic acid the octodecenyl ester of isocyanic acid may be employed.

Example 6

430 parts of polymeric ethylene imine are mixed with 210 parts of the dodecyl ester of isocyanic acid. As soon as the reaction which may be accelerated by heating is finished a paste-like product is obtained.

If a mixture of esters of isocyanic acid is employed containing instead of the dodecyl radicle the alkyl radicles of the alcohols obtainable by catalytic reduction of the palm kernel fatty acids a similar product is obtained.

What I claim is:

1. The process of producing nitrogenous condensation products which comprises causing an aliphatic ester of isocyanic acid to react with a compound selected from the class consisting of monomeric 1.2-alkylene imines and their polymerization products.

2. The process of producing nitrogenous condensation products, which comprises causing a monomeric 1.2-alkylene imine to react with an aliphatic ester of isocyanic acid.

3. The process of producing nitrogenous condensation products, which comprises causing a polymerization product of a 1.2-alkylene imine to react with an aliphatic ester of isocyanic acid.

4. The process of producing nitrogenous condensation products, which comprises causing monomeric ethylene imine to react with an aliphatic ester of isocyanic acid.

5. The process of producing nitrogenous condensation products, which comprises causing a polymerization product of an ethylene imine to react with an aliphatic ester of isocyanic acid.

6. Nitrogenous condensation products from an aliphatic ester of isocyanic acid and a compound selected from the class consisting of monomeric 1.2-alkylene imines and their polymerization products.

7. Nitrogenous condensation products from a monomeric 1.2-alkylene imine and an aliphatic ester of isocyanic acid.

8. Nitrogenous condensation products from a polymerization product of a 1.2-alkylene imine and an aliphatic ester of isocyanic acid.

9. Nitrogenous condensation products from monomeric ethylene imine and an aliphatic ester of isocyanic acid.

10. Nitrogenous condensation products from a polymerization product of an ethylene imine and an aliphatic ester of isocyanic acid.

HEINRICH ULRICH.